United States Patent
Kim et al.

(10) Patent No.: US 8,369,444 B2
(45) Date of Patent: Feb. 5, 2013

(54) APPARATUS AND METHOD FOR BEAMFORMING IN A MULTI-ANTENNA SYSTEM

(75) Inventors: Eun-Yong Kim, Hwaseong-si (KR); Eun-Seok Ko, Seongnam-si (KR); Yung-Soo Kim, Seongnam-si (KR); Myeon-Kyun Cho, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 992 days.

(21) Appl. No.: 12/322,587

(22) Filed: Feb. 4, 2009

(65) Prior Publication Data

US 2009/0195455 A1 Aug. 6, 2009

(30) Foreign Application Priority Data

Feb. 4, 2008 (KR) .................. 10-2008-0011234

(51) Int. Cl.
*H04L 27/00* (2006.01)

(52) U.S. Cl. ........ 375/295; 375/219; 375/220; 342/377; 342/385

(58) Field of Classification Search .............. 375/295, 375/220, 219; 342/377, 385
See application file for complete search history.

(56) References Cited

U.S. PATENT DOCUMENTS

| | | | | |
|---|---|---|---|---|
| 7,676,007 | B1* | 3/2010 | Choi et al. ............... | 375/347 |
| 2008/0227495 | A1* | 9/2008 | Kotecha et al. ............ | 455/562.1 |
| 2009/0004986 | A1* | 1/2009 | Park et al. ................. | 455/226.3 |

* cited by examiner

*Primary Examiner* — Kenneth Lam
*Assistant Examiner* — Michael Neff (57) ABSTRACT

An apparatus and method for beamforming in a multi-antenna system are provided. The method includes assuming at least one codeword comprised in a codebook as a precoding weight of a reference receive end and generating post-processing weights of at least two receive ends, confirming a codeword maximizing a sum rate using the post-processing weights, generating preceding weights of the receive ends using the codeword maximizing the sum rate, and precoding a transmit signal using the generated precoding weights and transmitting the precoded transmit signal to each receive end.

20 Claims, 4 Drawing Sheets

APPARATUS AND METHOD FOR BEAMFORMING IN A MULTI-ANTENNA SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Feb. 4, 2008 and assigned Serial No. 10-2008-0011234, the contents of which are herein incorporated by reference.

TECHNICAL FIELD OF THE INVENTION

The present application relates generally to a multi-antenna system. More particularly, the present invention relates to an apparatus and method for performing coordinated beamforming in a multi-antenna system of a multi-user environment.

BACKGROUND OF THE INVENTION

With a rapid growth of the wireless mobile communication market, a demand for a diversity of multimedia services in the wireless environment is made. In order to provide multimedia services, a research for multi-antenna systems (e.g., Multiple Input Multiple Output (MIMO) systems) achieving a large capacity of transmit data and a high speed of data transmission while being able to efficiently utilize the limited frequency resources is made.

A multi-antenna system transmits data using an independent channel by antenna and thus, can increase transmission reliability and a transmission rate compared to a single antenna system even without additional frequency or additional transmit power. Also, the multi-antenna system allows several users to simultaneously share space resources secured through a multiple antenna, thus being able to more increase frequency efficiency.

A multi-antenna system of a multiple user environment uses beamforming to cancel interference between users. For example, if the multi-antenna system uses coordinated beamforming to cancel interference between users, a transmit end generates a precoding weight and post-processing weight using downlink channel information. The precoding weight and post-processing weight have vector or matrix values.

If the multi-antenna system uses coordinated beamforming as above, the transmit end transmits a post-processing weight to a receive end. The transmit end transmits a post-processing weight to the receive end using a dedicated pilot or a feedforward channel.

In the case of using a dedicated pilot, there is a problem that, because the transmit end allocates the dedicated pilot to avoid pilot superposition at each receive end, a pilot overhead increases.

In the case of using a feedforward channel, there is a problem that, because the transmit end quantizes a post-processing weight for each receive end and transmits the quantized post-processing weight over the feedforward channel, a feedforward channel capacity increases in proportional to number of receive ends.

Also, in the case of reducing an amount of information transmitted over a feedforward channel from a transmit end, there is a problem that a quantization error increases and thus a throughput decreases.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for generating a precoding weight and post-processing weight for coordinated beamforming based on a codebook in a multi-antenna system of a multiple user environment.

Another aspect of the present invention is to provide an apparatus and method for generating a precoding weight and post-processing weight for coordinated beamforming based on a codebook in a transmit end of a multi-antenna system of a multiple user environment.

A further aspect of the present invention is to provide an apparatus and method for generating post-processing weights using a reference precoding weight that is set based on a codebook in a transmit end of a multi-antenna system of a multiple user environment.

A further another aspect of the present invention is to provide an apparatus and method for generating a post-processing weight using a codeword received from a transmit end in a receive end of a multi-antenna system of a multiple user environment.

The above aspects are achieved by providing an apparatus and method for beamforming in a multi-antenna system.

According to one aspect of the present invention, a method for beamforming in a transmit end of a multi-antenna system is provided. The method includes assuming each codeword in a codebook as a precoding weight of a reference receive end and generating post-processing weights of at least two receive ends, calculating a sum rate of each codeword which assumed the precoding weight of the reference receive end, using the post-processing weights, comparing the sum rate for each codeword and selecting a codeword maximizing a sum rate using the post-processing weights, generating preceding weights of the receive ends using the codeword maximizing the sum rate, and preceding a transmit signal using the generated precoding weights and transmitting the precoded transmit signal to each receive end, wherein the codebook includes at least one codeword, the reference receive end is among at least two receive end for service, the at least two receive includes the reference receive end.

According to another aspect of the present invention, a method for detecting a signal in a receive end of a multi-antenna system is provided. The method includes estimating a channel using signals received through at least two antennas, confirming a codeword corresponding to codeword index information received over a feedforward channel in a codebook comprising at least one codeword, generating a post-processing weight using the confirmed codeword and the estimated channel, estimating a channel gain using the estimated channel and the post-processing weight, and detecting a signal using the post-processing weight and the channel gain.

According to a further aspect of the present invention, an apparatus for beamforming in a transmit end of a multi-antenna system is provided. The apparatus includes a channel confirmer, a codeword selector, a weight generator, and a precoder. The channel confirmer confirms channel information of at least two receive ends. The codeword selector assumes each codeword in a codebook as a precoding weight of a reference receive end and generates post-processing weights of at least two receive ends using the codeword, selects a codeword maximizing a sum rate using the post-processing weights for each codeword. The weight generator generates precoding weights for the receive ends using the codeword maximizing the sum rate. The precoder precodes a transmit signal using the generated precoding weights and transmits the precoded transmit signal to each receive end.

According to a yet another aspect of the present invention, a receive end apparatus of a multi-antenna system is provided. The apparatus includes at least two antennas, a channel estimator, a codeword confirmer, a weight generator, a channel gain estimator, and a post-processor. The at least two antennas receive signals. The channel estimator estimates a channel using the signals received through the antennas. The codeword confirmer confirms a codeword corresponding to codeword index information received over a feedforward channel in a codebook comprising at least one codeword. The weight generator generates a post-processing weight using the confirmed codeword and the estimated channel. The channel gain estimator estimates a channel gain using the channel estimated in the channel estimator and the post-processing weight generated in the weight generator. The post-processor post-processes signals received through the antennas using the post-processing weight and channel gain.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication network.

A technology for generating a preceding weight and post-processing weight for coordinated beamforming based on a codebook in a multi-antenna system of a multiple user environment according to an exemplary embodiment of the present invention is described below.

In the following description, the precoding weight is called a transmit beamforming weight, and the post-processing weight is called a receive beamforming weight.

It is assumed that a transmit end is aware of downlink channel information of receive ends located in a service area. However, the same is applicable even if the transmit end is aware of inaccurate downlink channel information. If using a Time Division Duplex (TDD) scheme, a transmit end can estimate a downlink channel through a sounding channel or confirm downlink channel information estimated by respective receive ends through a feedback channel.

It is also assumed that a transmit end and a receive end share the same codebook to generate a transmit beamforming weight and a receive beamforming weight.

Figure 1:
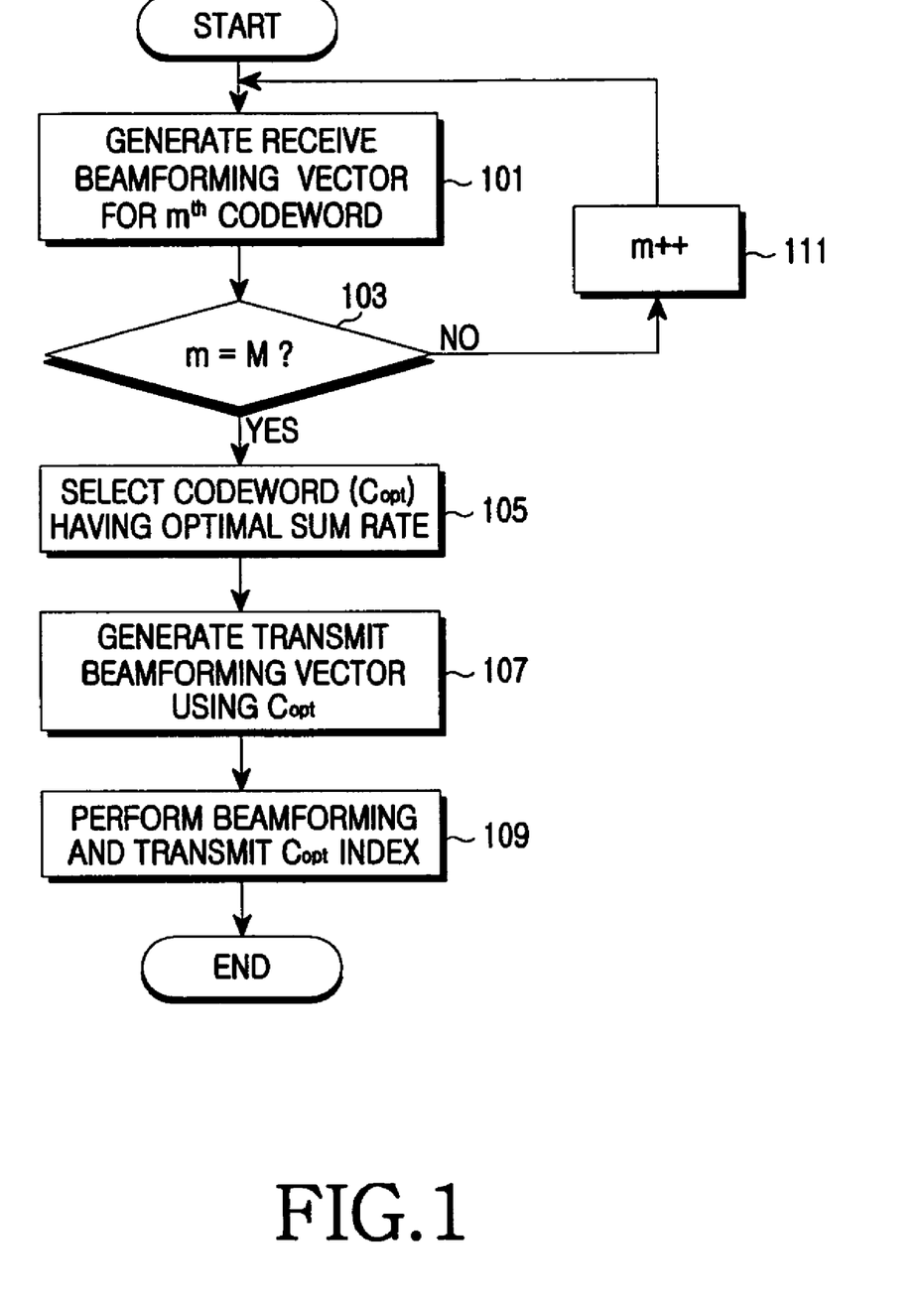
FIG. 1 is a flow diagram illustrating a process of generating a preceding weight and post-processing weight for coordinated beamforming in a transmit end of a multi-antenna system according to an exemplary embodiment of the present invention.

As shown in FIG. 1 below, a transmit end of a multi-antenna system generates a transmit beamforming weight and receive beamforming weight for coordinated beamforming based on a codebook.

FIG. 1 is a flow diagram illustrating a process of generating a precoding weight and post-processing weight for coordinated beamforming in a transmit end of a multi-antenna system according to an exemplary embodiment of the present invention.

Referring to FIG. 1, in step 101, the transmit end generates receive beamforming weights for receive ends using an $m^{th}$ codeword of a codebook. The transmit end generates receive beamforming weights of all receive ends for providing service using the $m^{th}$ codeword. For example, when the $m^{th}$ codeword is a transmit beamforming weight for a $j^{th}$ receive end, the transmit end generates receive beamforming weights for receive ends as given in Equation 1 below. The transmit end sets the transmit beamforming weight of the $j^{th}$ receive end as a reference transmit beamforming weight.

$$R_k = \begin{cases} (H_k c_m)^H / \|H_k c_m\|, & k = j \\ f_\perp(H_k c_m), & \text{otherwise} \end{cases}$$ [Eqn. 1]

$$\text{where } f_\perp\left(\begin{bmatrix} \alpha \\ \beta \end{bmatrix}\right) = \frac{1}{\sqrt{|\alpha|^2 + |\beta|^2}} [\beta - \alpha].$$

In Equation 1, '$R_k$' denotes a normalized receive beamforming weight for a $k^{th}$ receive end, '$H_k$' denotes downlink channel information of the $k^{th}$ receive end, 'C' denotes a codebook, and '$c_m$' denotes an $m^{th}$ codeword of the codebook. The value '$c_m$' means a transmit beamforming weight for a receive end having a reference transmit beamforming weight.

The codebook (C) includes codes of $2^M$ depending on number (M) of bits constituting the codebook (C={$c_1$, $c_3$, ..., $c_{2^M}$}).

In Equation 1, the transmit end sets an $m^{th}$ codeword as a transmit beamforming weight of a $j^{th}$ receive end. Thus, the transmit end generates a matched filter for the product of a channel of the $j^{th}$ receive end and the $m^{th}$ codeword and generates a receive beamforming weight of the $j^{th}$ receive end.

The matched filter means a filter for carrying out a conjugate transpose operation for a channel vector that is comprised of the product of a codeword and a channel.

If generating receive beamforming weights for other receive ends than the $j^{th}$ receive end, the transmit end selects an orthogonal vector for the product of a channel of a receive end for generating a receive beamforming weight and the $m^{th}$ codeword. After that, the transmit end generates a matched filter for the orthogonal vector and generates a receive beamforming weight of the receive end. The transmit end normalizes the generated receive beamforming weight to have a unit norm.

After generating the receive beamforming weights of the receive ends using the $m^{th}$ codeword in step 101, the transmit end proceeds to step 103 and confirms if it generates receive beamforming weights of receive ends using all codewords included in a codebook. Thus, the transmit end compares an index (m) of the codeword used to generate the receive beamforming weight in step 101 with the total number (M) of the codewords included in the codebook.

If 'm' is not equal to 'M' (m≠M) in step 103, the transmit end determines that it does not generate the receive beamforming weights of the receive ends using all the codewords. If so, in step 111, the transmit end increases a codeword index by one level (m++).

After increasing the codeword index by one level, the transmit end returns to step 101 and generates receive beamforming weights for receive ends using the $m^{th}$ codeword.

If 'm' is equal to 'M' (m=M) in step 103, the transmit end determines that it generates the receive beamforming weights of the receive ends using all the codewords. If so, in step 105, the transmit end selects a codeword maximizing a sum rate among the codewords included in the codebook. For example, the transmit end selects a codeword maximizing a sum rate using Equation 2 below. The transmit end selects a codeword maximizing a sum rate using an effective channel (G), as given in Equation 2 below. However, the transmit end may select a codeword maximizing a different parameter by controlling a transmit power.

$$c_{opt} = \underset{c_m \in C}{\operatorname{argmin}} Tr((GG^H)^{-1}) \text{ however, } G = \begin{bmatrix} R_1 & H_1 \\ \vdots & \\ R_K & H_K \end{bmatrix}.$$ [Eqn. 2]

In Equation 2, '$c_{opt}$' denotes a codeword maximizing a sum rate, '$c_m$' denotes an $m^{th}$ codeword in a codebook, 'G' denotes an effective channel matrix that is a channel matrix applying a receive beamforming weight, '$R_k$' denotes a normalized receive beamforming weight for a $k^{th}$ receive end, and '$H_k$' denotes downlink channel information of the $k^{th}$ receive end.

In Equation 2, the codeword maximizing the sum rate signifies a codeword minimizing an operation for $Tr((GG^H)^{-1})$ among the codewords included in the codebook. That is, if the transmit end uses an inverse matrix ($G^{-1}$) of an effective channel (G) as a transmit beamforming weight matrix, receive ends can receive signals without interference. If the transmit end does not separately normalize a transmit power of the transmit end by receive end, the transmit end divides a transmit signal by the Frobenius norm for the inverse matrix of the effective channel for transmission to normalize the whole signal. As the Frobenius norm value decreases, a Signal to Noise Ratio (SNR) of a receive end receiving a transmit signal increases. Thus, the transmit end selects a codeword minimizing an operation for $Tr((GG^H)^{-1})$ as in Equation 2. The Frobenius norm means a square root for a sum of the product of all elements of a matrix.

The transmit beamforming weight of Equation 2 is not normalized. If normalizing a transmit beamforming weight, the transmit end selects a codeword maximizing a sum rate using Equation 3:

$$c_{opt} = \underset{c_i \in C}{\operatorname{argmin}} \sum_k \log\left(1 + \|H_k T_k\|^2 \cdot \frac{E_s}{KN_0}\right).$$ [Eqn. 3]

In Equation 3, '$c_{opt}$' denotes a codeword maximizing a sum rate, '$c_i$' denotes an $i^{th}$ codeword in a codebook, '$H_k$' denotes downlink channel information of a $k^{th}$ receive end, '$E_s$' denotes the whole transmit power, 'K' denotes number of receive ends, '$N_0$' denotes a magnitude of a noise power of a receive end, '$T_k$' denotes a transmit beamforming weight for the $k^{th}$ receive end, and 'C' denotes a codebook.

The transmit end normalizes and calculates the transmit beamforming weight for the $k^{th}$ receive end as given in Equation 4:

$$T_k = \frac{q_k}{\|q_k\|}, [q_1, \ldots, q_K] = \begin{bmatrix} R_1^H & H_1 \\ & \vdots & \\ R_K^H & H_K \end{bmatrix}^{-1}.$$ [Eqn. 4]

In Equation 4, '$T_k$' denotes a normalized transmit beamforming weight for a $k^{th}$ receive end, '$q_k$' denotes an effective channel applying a receive beamforming weight, '$R_k$' denotes a receive beamforming weight for the $k^{th}$ receive end, and '$H_k$' denotes downlink channel information of the $k^{th}$ receive end.

In Equation 3, the codeword maximizing the sum rate signifies a codeword whose sum rate is maximized. That is, if the transmit end normalizes and uses each column of an inverse matrix ($G^{-1}$) of an effective channel (G) as a transmit beamforming weight matrix, receive ends can receive signals without interference.

After determining the codeword maximizing the sum rate in step 105, the transmit end goes to step 107 and generates transmit beamforming weights for receive ends using the codeword maximizing the sum rate. Assuming transmitting a signal to one receive end through one stream, the transmit end generates transmit beamforming weights for receive ends by performing power normalization as in Equation 5 below such that streams each have the same SNR.

$$T = \frac{G^{-1}}{Tr((GG^H)^{-1})}.$$ [Eqn. 5]

In Equation 5, 'T' denotes a matrix of transmit beamforming weights for receive ends, and 'G' denotes an effective channel matrix applying a receive beamforming weight.

As in Equation 5, the transmit end normalizes a transmit signal for an inverse matrix of an effective channel and generates a transmit beamforming weight. Column vectors of the 'T' matrix represent transmit beamforming weights of data to be transmitted to respective receive ends.

As described above, the transmit end generates transmit beamforming weights using a codeword maximizing a sum rate. The transmit end recognizes, as receive beamforming weights of receive ends, receive beamforming weights generated using the codeword maximizing the sum rate among the receive beamforming weights generated using the codeword in step 101.

Unlike Equation 5, the transmit end may normalize each column of an inverse matrix ($G^{-1}$) and generate transmit beamforming weights as in Equation 6 below. The transmit end normalizes each column to 1/sqrt (K), not '1', to set the whole power to '1'.

$$T = \frac{1}{\sqrt{K}}[T_1, \ldots, T_k] \quad \text{[Eqn. 6]}$$

$$T_k = \frac{q_k}{\|q_k\|}$$

$$[q_1, \ldots, q_K] = \begin{bmatrix} R_1^H & H_1 \\ \vdots \\ R_K^H & H_K \end{bmatrix}^{-1}.$$

In Equation 6, 'T' denotes a matrix of transmit beamforming weights for receive ends, 'K' denotes an index of a receive end, '$T_k$' denotes a normalized transmit beamforming weight for a $k^{th}$ receive end, '$q_k$' denotes an effective channel applying a receive beamforming weight, '$R_k$' denotes a receive beamforming weight for the $k^{th}$ receive end, and '$H_k$' denotes downlink channel information of the $k^{th}$ receive end.

After generating the transmit beamforming weights in step 107, the transmit end goes to step 109 and performs beamforming to a corresponding receive end through each antenna using the transmit beamforming weight generated in step 107. At this time, the transmit end transmits an index of a codeword maximizing a sum rate to receive ends over a feedforward channel.

The transmit end transmits one pilot shared by at least one or more transmit beamforming weights among transmit beamforming weights.

After that, the transmit end terminates the process according to an exemplary embodiment of the present invention.

In the aforementioned exemplary embodiment of the present invention, a transmit end normalizes power as in Equation 5 or normalizes power by receive end as in Equation 6 in order to set the same SNR to respective streams.

In another exemplary embodiment of the present invention, if setting a different SNR to each stream, a transmit end may multiply each stream by a power loading value using a diagonal matrix.

As described above, as given in Equation 1, a transmit end sets a codeword included in a codebook as a transmit beamforming weight of a $j^{th}$ receive end and generates a receive beamforming weight for each receive end. Thus, the receive end can generate a receive beamforming weight using only information on the codeword received from the transmit end as shown in FIG. 2 below.

Figure 2:
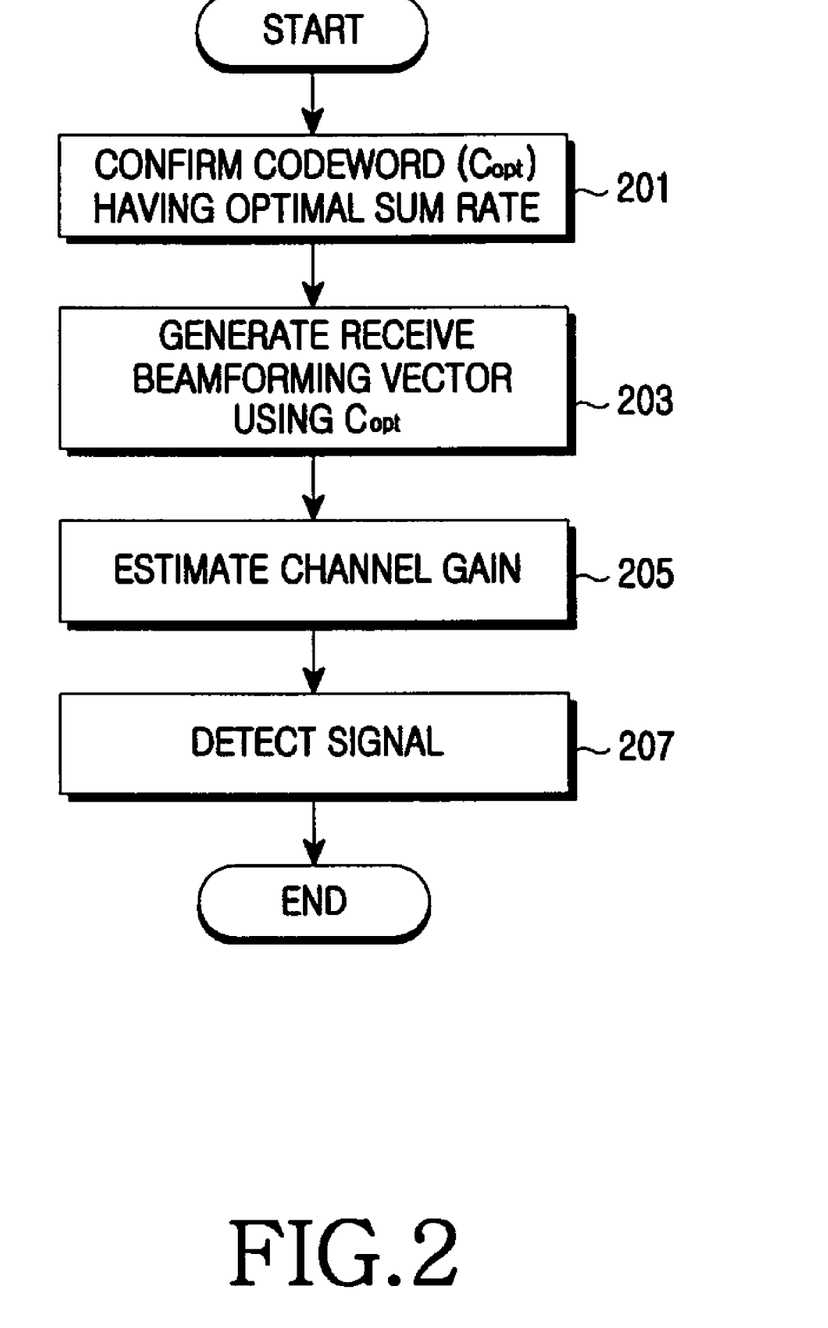
FIG. 2 is a flow diagram illustrating a process of confirming a post-processing weight for coordinated beamforming in a receive end of a multi-antenna system according to an exemplary embodiment of the present invention.

FIG. 2 is a flow diagram illustrating a process of confirming a post-processing weight for coordinated beamforming in a receive end of a multi-antenna system according to an exemplary embodiment of the present invention.

Referring to FIG. 2, in step 201, the receive end confirms a codeword ($c_{opt}$) maximizing a sum rate among codewords included in a codebook. For example, the receive end confirms, in the codebook, a codeword ($c_{opt}$) corresponding to a codeword index received through a feedforward channel.

After confirming the codeword maximizing the sum rate, the receive end goes to step 203 and generates a receive beamforming weight using the codeword and channel information. For example, the receive end generates a receive beamforming weight as given in Equation 7 below. The receive end normalizes the receive beamforming weight to have a unit norm.

$$R_k = \begin{cases} (H_k c_{opt})^H / \|H_k c_{opt}\|, & k = j \\ f_\perp(H_k c_{opt}), & \text{otherwise} \end{cases} \quad \text{[Eqn. 7]}$$

$$\text{where } f_\perp\left(\begin{bmatrix} \alpha \\ \beta \end{bmatrix}\right) = \frac{1}{\sqrt{|\alpha|^2 + |\beta|^2}}[\beta - \alpha].$$

In Equation 7, '$R_k$' denotes a normalized receive beamforming weight for a $k^{th}$ receive end, '$H_k$' denotes downlink channel information of the $k^{th}$ receive end, and '$c_{opt}$' denotes a codeword maximizing a sum rate.

As in Equation 7, the receive end generates a matched filter for the product of a downlink channel with a transmit end and a codeword maximizing a sum rate and generates a receive beamforming weight.

After generating the receive beamforming weight in step 203, the receive end goes to step 205 and calculates an effective channel gain using the receive beamforming weight generated in step 203. For example, the receive end estimates an effective channel gain using the generated receive beamforming weight and the estimated channel.

After acquiring the receive beamforming weight and effective channel gain, in step 207, the receive end detects a signal using the receive beamforming weight and effective channel gain.

Then, the receive end terminates the process according to an exemplary embodiment of the present invention.

The following description is for a method for generating and transmitting a receive beamforming weight in a base station (BS) of a multi-antenna system that is comprised of a BS including two antennas and two mobile stations (MSs) including two antennas. The assumption is that one MS receives a signal through one stream from the BS.

As in Equation 8 below, the BS generates receive beamforming weights of an MS 1 and an MS 2 using an $m^{th}$ codeword. It is assumed that a transmit beamforming weight of the MS 1 is set as a reference transmit beamforming weight.

$$R_1 = (H_1 c_m)^H / \|H_1 c_m\| \quad \text{[Eqn. 8]}$$

$$R_2 = f_\perp(H_2 c_m).$$

In Equation 8, '$R_k$' denotes a normalized receive beamforming weight for a $k^{th}$ receive end, '$H_k$' denotes downlink channel information of the $k^{th}$ receive end, and '$c_m$' denotes an $m^{th}$ codeword of a codebook. The value '$c_m$' means a transmit beamforming weight of a first MS having a reference transmit beamforming weight.

The BS constructs an effective channel matrix using the receive beamforming weights of MSs generated in Equation 8, as given in Equation 9:

$$G = \begin{bmatrix} R_1 & H_1 \\ R_2 & H_2 \end{bmatrix}. \quad \text{[Eqn. 9]}$$

In Equation 9, 'G' denotes an effective channel matrix applying a receive beamforming weight, '$R_k$' denotes a normalized receive beamforming weight for a $k^{th}$ MS, and '$H_k$' denotes downlink channel information of the $k^{th}$ MS.

If a codebook is constituted of two bits, the BS generates four effective channel matrixes constructed as in Equation 9. The BS applies the effective channel matrixes to Equation 2 and determines a codeword having the maximum sum rate. For another example, the BS may determine a codeword having the maximum sum rate using Equation 3.

The BS applies an effective matrix of a codeword having the maximum sum rate to Equation 5 and generates transmit beamforming weights for MSs. For another example, the BS may generate transmit beamforming weights for MSs using Equation 6. The BS transmits an index of a codeword having the maximum sum rate to an MS over a feedforward channel.

If the BS transmits an index of a codeword over a feedforward channel as above, an MS generates a receive beamforming weight according to the codeword index received from the BS as in Equation 10:

$$R_1 = (H_1 c_{opt})^H / \|H_1 c_{opt}\| \quad \text{[Eqn. 10]}$$
$$R_2 = f_\perp(H_2 c_{opt}).$$

In Equation 10, '$R_k$' denotes a receive beamforming weight for a $k^{th}$ MS, '$H_k$' denotes downlink channel information of the $k^{th}$ MS, and '$c_{opt}$' denotes a codeword acquired through a feedforward channel.

In the aforementioned exemplary embodiment of the present invention, a transmit end sets a codeword of a codebook as a transmit beamforming weight of a first receive end and generates transmit beamforming weights and receive beamforming weights for other receive ends.

In another exemplary embodiment of the present invention, a transmit end may generate transmit beamforming weights and receive beamforming weights for other receive ends on the basis of a transmit beamforming weight having the highest sum rate without setting a codeword of a codebook as a transmit beamforming weight of a specific receive end. For example, as given Equation 11 below, the transmit end generates transmit beamforming weights and receive beamforming weights for receive ends on the basis of a transmit beamforming weight having the highest sum rate. The transmit end can simultaneously determine a reference transmit beamforming weight and a codeword generating the reference transmit beamforming weight.

$$\{p_{opt}, c_{opt}\} = \underset{\{1 \le p \le K, c_i \in C\}}{\mathrm{argmin}} Tr((GG^H)^{-1}). \quad \text{[Eqn. 11]}$$

In Equation 11, '$p_{opt}$' denotes an index of a transmit beamforming weight having the highest sum rate, '$c_{opt}$' denotes an index of a codeword for a transmit beamforming weight having the highest sum rate, 'G' denotes an effective channel matrix applying a receive beamforming weight, '$c_i$' denotes an $i^{th}$ codeword included in a codebook (C), and 'K' denotes number of receive ends. The index of the transmit beamforming weight is the same as an index of a receive end for the transmit beamforming weight.

Assuming that 'p' denotes an index of a reference transmit beamforming weight of Equation 11, a transmit end generates a receive beamforming weight on the basis of a transmit beamforming weight of a $p^{th}$ receive end as in Equation 12:

$$R_k = \begin{cases} (H_k c_m)^H / \|H_k c_m\|, & k = p \\ f_\perp(H_k c_m), & \text{otherwise} \end{cases} \quad \text{[Eqn. 12]}$$

In Equation 12, '$R_k$' denotes a normalized receive beamforming weight for a $k^{th}$ receive end, '$H_k$' denotes downlink channel information of the $k^{th}$ receive end, 'C' denotes a codebook, and '$c_m$' denotes an $m^{th}$ codeword of the codebook.

The following description is for a construction of a transmit end for generating a precoding weight and post-processing weight for coordinated beamforming based on a codebook.

Figure 3:
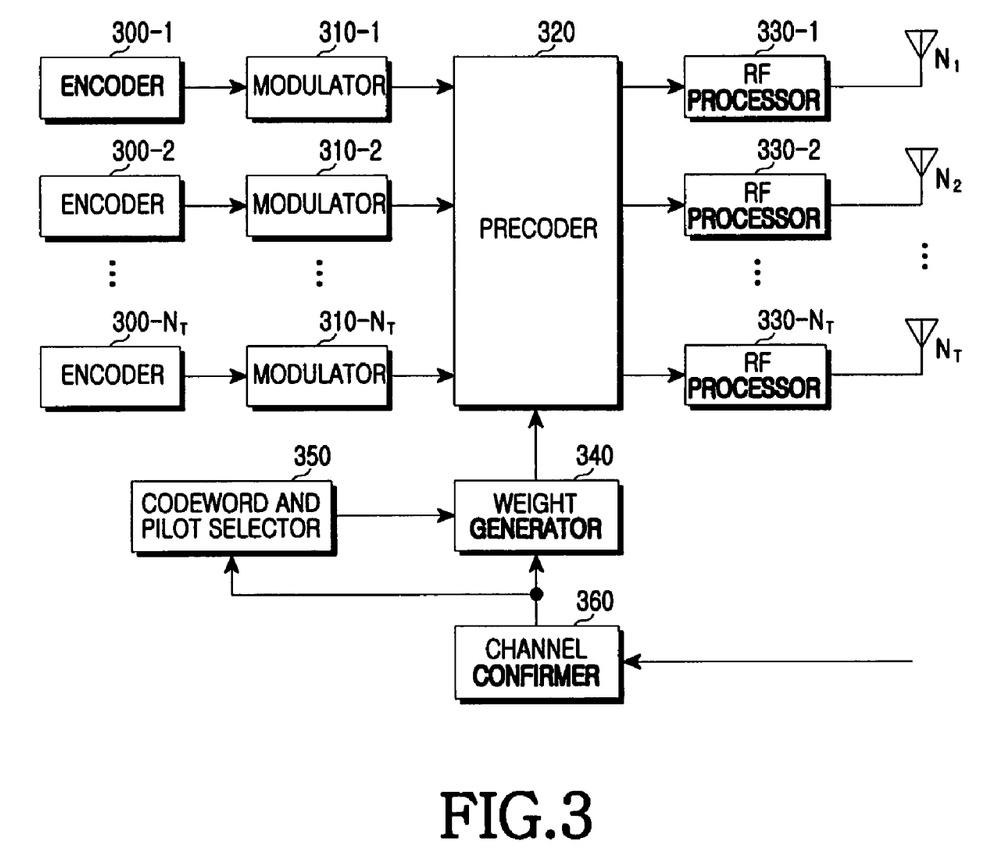
FIG. 3 is a block diagram illustrating a construction of a transmit end in a multi-antenna system according to an exemplary embodiment of the present invention.

FIG. 3 is a block diagram illustrating a construction of a transmit end in a multi-antenna system according to an exemplary embodiment of the present invention.

As shown in FIG. 3, the transmit end includes encoders 300-1, 300-2, and 300-$N_T$, modulators 310-1, 310-2, and 310-$N_T$, a precoder 320, Radio Frequency (RF) processors 330-1, 330-2, and 330-$N_T$, a weight generator 340, a codeword and pilot selector 350, and a channel confirmer 360.

The encoders 300-1, 300-2, and 300-$N_T$ are constructed by antenna and encode transmit data to be transmitted over a corresponding antenna according to a corresponding modulation level (e.g., a Modulation and Coding Scheme (MCS) level). The modulators 310-1, 310-2, and 310-$N_T$ are constructed by antenna and modulate signals received from the corresponding encoders 300-1, 300-2, and 300-$N_T$ according to a corresponding modulation level.

The precoder 320 precodes data received from the respective modulators 310-1, 310-2, and 310-$N_T$ using a transmit beamforming weight received from the weight generator 340. The precoder 320 outputs data to be transmitted through a first antenna ($N_1$) to the first RF processor 330-1, and outputs data to be transmitted through an $N_T^{th}$ antenna ($N_T$) to an $N_T^{th}$ RF processor 330-$N_T$.

The precoder 320 transmits one pilot shared by at least one or more transmit beamforming weights among the transmit beamforming weights.

The RF processors 330-1, 330-2, and 330-$N_T$ convert data received from the precoder 320 into analog RF signals and transmit the converted signals to respective receive ends through corresponding antennas ($N_1$, $N_2$, and $N_T$).

The channel confirmer 360 confirms channels of receive ends located in a service area. For example, the channel confirmer 360 estimates a channel through a sounding channel. In another example, the channel confirmer 360 confirms channel information received over a feedback channel from receive ends.

The codeword and pilot selector 350 generates receive beamforming weights of receive ends for providing service using channel information confirmed in the channel confirmer 360 and codewords included in a codebook. Although not illustrated, the codeword and pilot selector 350 is comprised of a receive beamforming weight generator and a codeword selector. The beamforming weight generator generates receive beamforming weights of receive ends using Equation 1. The codeword selector applies an effective channel matrix of receive beamforming weights generated in the beamforming weight generator to Equation 2 and determines a codeword maximizing a sum rate. The codeword selector may determine a codeword maximizing a sum rate using Equation 3.

In yet another example, the codeword and pilot selector 350 selects a codeword having the highest sum rate and a receive end having a reference transmit beamforming weight using Equation 11. After that, the codeword and pilot selector 350 generates receive beamforming weights for receive ends using Equation 12 on the basis of the selected receive end.

The weight generator 340 generates transmit beamforming weights for receive ends by performing power normalization of Equation 5 such that streams each have the same SNR using a codeword selected in the codeword and pilot selector 350. Column vectors of a matrix generated as in Equation 5 represent transmit beamforming weights of respective receive ends.

In still another example, the weight generator 340 may generate transmit beamforming weights for receive ends by normalizing each column of an inverse matrix ($G^{-1}$) as in Equation 6. The transmit end normalizes each column to 1/sqrt (K), not '1', to set the whole power to '1'.

Although not illustrated, the transmit end includes a control channel transmitter, and transmits index information of a codeword maximizing a sum rate determined in the codeword and pilot selector 350 to receive ends over a feedforward channel. The index information of the codeword represents an index of a codeword included in a codebook.

The following description is for a construction of a receive end for generating a post-processing weight for coordinated beamforming based on a codebook.

Figure 4:
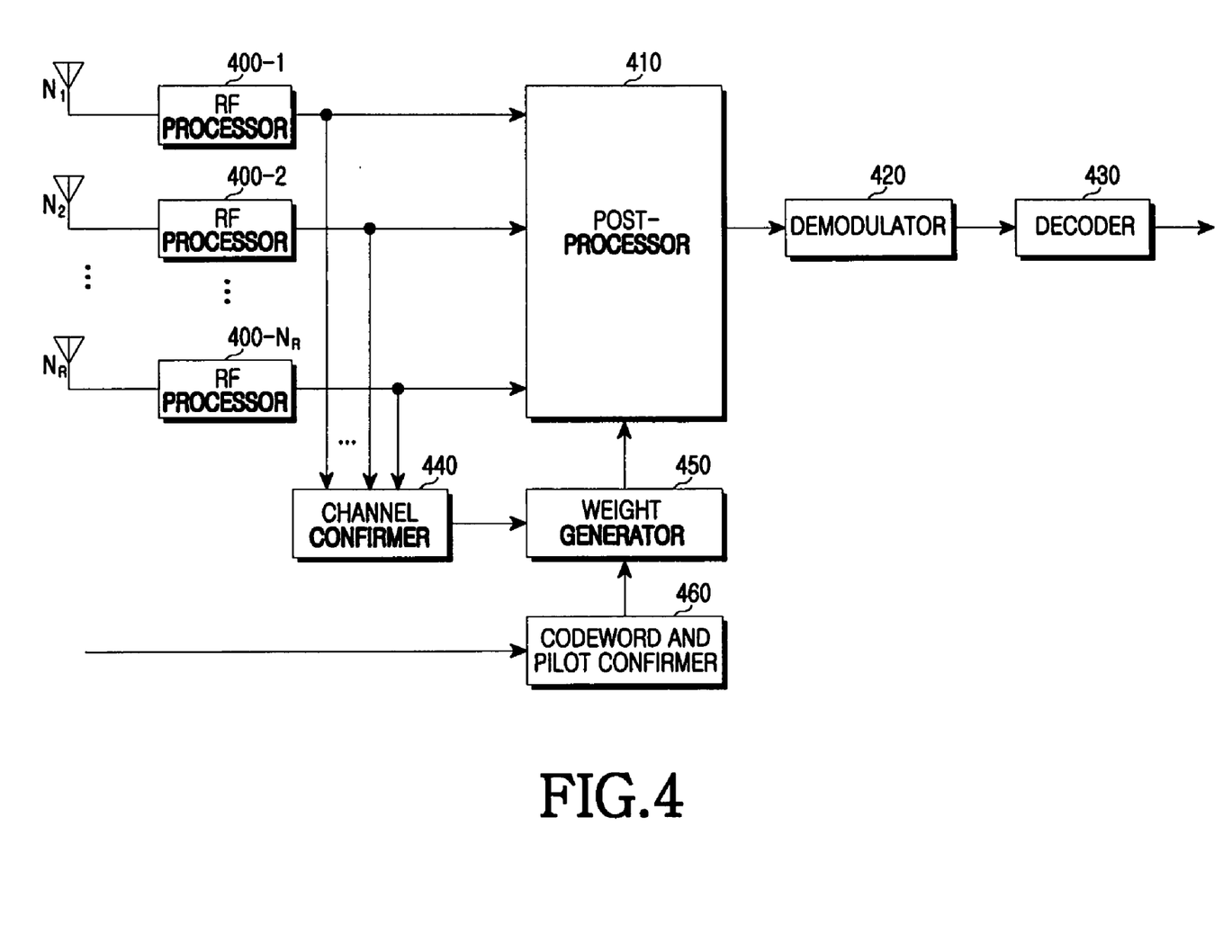
FIG. 4 is a block diagram illustrating a construction of a receive end in a multi-antenna system according to an exemplary embodiment of the present invention.

FIG. 4 is a block diagram illustrating a construction of a receive end in a multi-antenna system according to an exemplary embodiment of the present invention.

As shown in FIG. 4, the receive end includes RF processors 400-1, 400-2, and 400-$N_R$, a post-processor 410, a demodulator 420, a decoder 430, a channel confirmer 440, a weight generator 450, and a codeword and pilot confirmer 460.

The RF processors 400-1, 400-2, and 400-$N_R$ convert high frequency signals received through respective antennas into baseband signals.

The post-processor 410 post-processes signals received from the respective RF processors 400-1, 400-2, and 400-$N_R$ using a receive beamforming weight received from the weight generator 450.

The demodulator 420 demodulates a signal received from the post-processor 410 according to a corresponding modulation level. The decoder 430 decodes a signal received from the demodulator 420 according to a corresponding modulation level and detects original data.

The channel confirmer 440 estimates a channel with a transmit end using pilots included in signals received from the RF processors 400-1, 400-2, and 400-$N_R$. For example, if the transmit end transmits one pilot shared by at least one or more transmit beamforming weights, the channel confirmer 440 estimates a channel using the pilot.

The codeword and pilot confirmer 460 confirms a codeword corresponding to index information of a codeword received from the transmit end over a feedforward channel, in a codebook.

The codeword and pilot confirmer 460 acquires information of a reference receive end selected to generate a transmit beamforming weight and a receive beamforming weight in the transmit end.

The weight generator 450 generates a receive beamforming weight for post-processing a signal in the post-processor 410 using a codeword received from the codeword and pilot confirmer 460. For example, the weight generator 450 generates a receive beamforming weight using the codeword as in Equation 7. The weight generator 450 generates a receive beamforming weight using Equation 7 depending on reference receive end information confirmed in the codeword and pilot confirmer 460.

Although not illustrated, the receive end further includes a channel gain estimator. The channel gain estimator estimates a channel gain using a channel estimated in the channel confirmer 440 and a post-processing weight generated in the weight generator 450.

Thus, the post-processor 410 may post-process signals received from the respective RF processors 400-1, 400-2, 400-$N_R$ using a receive beamforming weight received from the weight generator 450 and a channel gain received from the channel gain estimator.

As described above, an exemplary embodiment of the present invention has an advantage of, by generating a precoding weight and post-processing weight based on a codebook, generating the precoding weight and post-processing weight without performing a repeated operation, thus reducing an operation complexity and reducing a feedforward information amount transmitting the post-processing weight in a multi-antenna system of a multiple user environment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for beamforming in a transmit end of a multi-antenna system, the method comprising:
   for each codeword in a codebook,
      generating post-processing weights of at least two receive ends using the codeword as a precoding weight of a reference receive end, wherein one of the receive ends comprises the reference receive end, the generating comprising confirming channel information of the reference receive end, generating a channel vector for a product of the confirmed channel information and the codeword used as the precoding weight of the reference receive end, operating a conjugate transpose for the channel vector, and generating the post-processing weights; and
      calculating a sum rate for the codeword using the post-processing weights;
   comparing the sum rates and selecting as an optimal codeword the codeword having a maximum sum rate;
   generating precoding weights of the receive ends using the optimal codeword; and
   precoding a transmit signal using the generated precoding weights and transmitting the precoded transmit signal to each receive end.

2. The method of claim 1, wherein generating each post-processing weight comprises:
   confirming channel information of a receive end other than the reference receive end;
   confirming an orthogonal vector for the product of the confirmed channel information of the receive end and the codeword used as the precoding weight of the reference receive end; and
   operating a conjugate transpose for the orthogonal vector and generating the post-processing weight.

3. The method of claim 1, wherein calculating a sum rate for the codeword using the post-processing weights comprises:
   generating an effective channel using the post-processing weight for the codeword; and
   calculating the sum rate using the effective channel.

4. The method of claim 1, wherein the optimal codeword is defined as:

$$c_{opt} = \underset{c_m \in C}{\operatorname{argmin}} Tr((GG^H)^{-1}), \text{ wherein, } G = \begin{bmatrix} R_1 & H_1 \\ \vdots & \\ R_K & H_K \end{bmatrix},$$

is the optimal codeword, $c_m$ is a $m^{th}$ codeword in the codebook, G is an effective channel matrix applying the post-processing weights, m is an index of a codeword in the codebook, k is an index of a receive end, $R_k$ is a normalized post-processing weight for a $k^{th}$ receive end, $H_k$ is downlink channel information of the $k^{th}$ receive end, and Tr ( ) denotes a trace function.

5. The method of claim 1, wherein the optimal codeword is defined as:

$$c_{opt} = \underset{c_i \in C}{\operatorname{argmin}} \sum_k \log\left(1 + \|H_k T_k\|^2 \cdot \frac{E_s}{KN_0}\right)$$

$$T_k = \frac{q_k}{\|q_k\|}, [q_1, \ldots, q_K] = \begin{bmatrix} R_1^H & H_1 \\ \vdots & \\ R_K^H & H_K \end{bmatrix}^{-1},$$

wherein
$c_{opt}$: optimal codeword,
$c_i$: $i^{th}$ codeword in codebook,
$H_k$: downlink channel information of $k^{th}$ receive end,
$E_s$: whole transmit power,
K: number of receive ends,
$N_0$: magnitude of noise power of receive end,
$T_k$: precoding weight for $k^{th}$ receive end,
$q_k$: effective channel applying post-processing weight, and
$R_k$: post-processing weight for $k^{th}$ receive end.

6. The method of claim 1, further comprising, after selecting the optimal codeword, transmitting an index of the optimal codeword to the receive ends over a feedforward channel.

7. The method of claim 1, further comprising, after generating the precoding weights, transmitting a pilot shared by at least one or more precoding weights among the precoding weights.

8. A method for detecting a signal in a receive end of a multi-antenna system, the method comprising:
estimating a channel using signals received through at least two antennas;
confirming a codeword corresponding to codeword index information received over a feedforward channel in a codebook comprising at least one codeword;
generating a post-processing weight using the confirmed codeword and the estimated channel, the generating comprising, when a transmit end sets the receive end as a reference receive end, generating a channel vector for a product of the confirmed codeword and the estimated channel, and operating a conjugate transpose for the channel vector;
estimating a channel gain using the estimated channel and the post-processing weight; and
detecting a signal using the post-processing weight and the channel gain.

9. The method of claim 8, wherein, when the transmit end does not set the receive end as the reference receive end, generating the post-processing weight comprises:

confirming an orthogonal vector for the product of the confirmed codeword and the estimated channel; and
operating a conjugate transpose for the orthogonal vector and generating a post-processing weight.

10. An apparatus for beamforming in a transmit end of a multi-antenna system, the apparatus comprising:
a channel confirmer configured to confirm channel information of at least two receive ends;
a codeword selector configured to, for each codeword in a codebook, generate post-processing weights of the at least two receive ends using the codeword as a precoding weight of a reference receive end, and further configured to select as an optimal codeword the codeword having a maximum sum rate as determined using the post-processing weights for each codeword;
a weight generator configured to generate precoding weights for the receive ends using the optimal codeword; and
a precoder configured to precode a transmit signal using the generated precoding weights and transmit the precoded transmit signal to each receive end,
wherein to generate each post-processing weight, the codeword selector is configured to generate a channel vector for a product of the confirmed channel info nation of the reference receive end and the codeword used as the precoding, weight of the reference receive end, operate a conjugate transpose for the channel vector, and generate the post-processing weight.

11. The apparatus of claim 10, wherein the codeword selector comprises:
a post-processing weight generator configured to, for each codeword, generate the post-processing weights; and
a codeword selector configured to select as the optimal codeword the codeword having the maximum sum rate as determined using the post-processing weights generated in the post-processing weight generator.

12. The apparatus of claim 11, wherein the post-processing weight generator is configured to confirm an orthogonal vector for a product of channel information of a receive end other than the reference receive end and the codeword used as the precoding weight of the reference receive end, operate a conjugate transpose for the orthogonal vector, and generate a post-processing weight.

13. The apparatus of claim 11, wherein the codeword selector is configured to select the optimal codeword using an effective channel generated using the post-processing weights for the codeword used as the precoding weight of the reference receive end.

14. The apparatus of claim 10, wherein the precoder is configured to transmit one pilot shared by at least one or more precoding weights among the precoding weights generated in the weight generator.

15. The apparatus of claim 10, further comprising a control channel transmitter configured to transmit an index of the optimal codeword to the receive ends over a feedforward channel.

16. The apparatus of claim 10, wherein the optimal codeword is defined as:

$$c_{opt} = \underset{c_m \in C}{\operatorname{argmin}} Tr((GG^H)^{-1}), \text{ wherein, } G = \begin{bmatrix} R_1 & H_1 \\ \vdots & \\ R_K & H_K \end{bmatrix},$$

is the optimal codeword, $c_m$ is a $m^{th}$ codeword in the codebook, G is an effective channel matrix applying the post-processing weights, m is an index of a codeword in the codebook, k is an index of a receive end, $R_k$ is a normalized post-processing weight for a $k^{th}$ receive end, $H_k$ is downlink channel information of the $k^{th}$ receive end, and Tr ( ) denotes a trace function.

17. The apparatus of claim 10, wherein the optimal codeword is defined as:

$$c_{opt} = \underset{c_i \in C}{\mathrm{argmin}} \sum_k \log\left(1 + \|H_k T_k\|^2 \cdot \frac{E_s}{KN_0}\right)$$

$$T_k = \frac{q_k}{\|q_k\|}, [q_1, \ldots, q_K] = \begin{bmatrix} R_1^H & H_1 \\ \vdots & \\ R_K^H & H_K \end{bmatrix}^{-1},$$

wherein
$c_{opt}$: optimal codeword,
$c_i$: $i^{th}$ codeword in codebook,
$H_k$: downlink channel information of $k^{th}$ receive end,
$E_s$: whole transmit power,
K: number of receive ends,
$N_0$: magnitude of noise power of receive end,
$T_k$: precoding weight for $k^{th}$ receive end,
$q_k$: effective channel applying post-processing weight, and
$R_k$: post-processing weight for $k^{th}$ receive end.

18. The apparatus of claim 10, wherein, after selection of the optimal codeword, the transmit end is configured to transmit an index of the optimal codeword to the receive ends over a feedforward channel.

19. A receive end apparatus of a multi-antenna system, the apparatus comprising:
at least two antennas configured to receive signals;
a channel estimator configured to estimate a channel using the signals received through the antennas;
a codeword confirmer configured to confirm a codeword corresponding to codeword index information received over a feedforward channel in a codebook comprising at least one codeword;
a weight generator configured to generate a post-processing weight using the confirmed codeword and the estimated channel, wherein, when a transmit end sets the receive end as a reference receive end, the weight generator is configured to generate a channel vector for a product of the confirmed codeword and the estimated channel, operate a conjugate transpose for the channel vector, and generate the post-processing weight;
a channel gain estimator configured to estimate a channel gain using the channel estimated in the channel estimator and the post-processing weight generated in the weight generator; and
a post-processor configured to post-process signals received through the antennas using the post-processing weight and channel gain.

20. The apparatus of claim 19, wherein, when the transmit end does not set the receive end as a reference receive end, the weight generator is configured to confirm an orthogonal vector for the product of the channel information estimated in the channel estimator and the codeword confirmed in the codeword confirmer, operate a conjugate transpose for the orthogonal vector, and generate a post-processing weight.

* * * * *